(12) United States Patent
Wynn et al.

(10) Patent No.: US 7,510,594 B2
(45) Date of Patent: Mar. 31, 2009

(54) GAS SEPARATION MEMBRANE MODULE ASSEMBLY

(75) Inventors: Nicholas P Wynn, Palo Alto, CA (US); Donald A. Fulton, Fairfield, CA (US)

(73) Assignee: Membrane Technology and Research, Inc., Menlo Park, CA (US)

( * ) Notice: Subject to any disclaimer, the term of this patent is extended or adjusted under 35 U.S.C. 154(b) by 479 days.

(21) Appl. No.: 11/271,402

(22) Filed: Nov. 13, 2005

(65) Prior Publication Data

US 2007/0107596 A1    May 17, 2007

(51) Int. Cl.
*B01D 53/22* (2006.01)

(52) U.S. Cl. .................. 95/45; 95/51; 95/52; 95/54; 96/4; 96/7; 96/8; 96/9; 96/10; 210/321.78; 210/321.79; 210/321.88

(58) Field of Classification Search .............. 96/4, 96/7, 8, 9, 10; 95/45, 51, 52, 54; 210/321.72, 210/321.74, 321.78, 321.79, 321.8, 321.88, 210/321.89, 500.23
See application file for complete search history.

(56) References Cited

U.S. PATENT DOCUMENTS

| | | | | |
|---|---|---|---|---|
| 3,774,771 A | | 11/1973 | Manjikian et al. | |
| 4,083,780 A | * | 4/1978 | Call | 210/321.74 |
| 5,238,563 A | | 8/1993 | Smith, Jr. et al. | |
| 6,755,894 B2 | * | 6/2004 | Bikson et al. | 96/8 |
| 6,942,797 B1 | * | 9/2005 | Chancellor et al. | 210/321.64 |
| 7,179,323 B2 | * | 2/2007 | Stein et al. | 96/7 |
| 2005/0029192 A1 | * | 2/2005 | Arnold et al. | 210/321.72 |
| 2005/0284293 A1 | * | 12/2005 | Rubas | 96/8 |
| 2006/0144777 A1 | * | 7/2006 | Kumano et al. | 210/321.79 |
| 2006/0174762 A1 | * | 8/2006 | Kaschemekat et al. | 96/8 |

OTHER PUBLICATIONS

U.S. Appl. No. 11/050,995, Kaschemekat et al.

* cited by examiner

*Primary Examiner*—Jason M Greene
(74) *Attorney, Agent, or Firm*—J. Farrant

(57) ABSTRACT

A gas-separation membrane module assembly and a gas-separation process using the assembly. The assembly includes a set of tubes, each containing gas-separation membranes, arranged within a housing. The housing contains a tube sheet that divides the space within the housing into two gas-tight spaces. A permeate collection system within the housing gathers permeate gas from the tubes for discharge from the housing.

39 Claims, 8 Drawing Sheets

GAS SEPARATION MEMBRANE MODULE ASSEMBLY

This invention was made in part with Government support under SBIR award number DE-FG02-03ER83836, awarded by the U.S. Department of Energy. The Government has certain rights in this invention.

FIELD OF THE INVENTION

The invention relates to gas separation membranes, and specifically to an assembly for gas separation membranes. In particular, the invention relates to an assembly of multiple membrane modules contained in a single housing or pressure vessel.

BACKGROUND OF THE INVENTION

Gas separation membranes have been in industrial use for close to 25 years. Various types of membrane are available, although almost all commercially successful membranes are polymeric membranes formed as flat sheets or hollow fibers.

For use, it is desirable to pack a large membrane area into a small volume. Because membranes are delicate, susceptible to damage and may have a limited operating life, they are normally factory-built into modules or elements.

Two predominant types of membrane modules have emerged. If the membranes are in hollow-fiber form, bundles or hanks of closely spaced fibers are potted in a cylindrical pressure housing or tube. A single hollow fiber module may contain as much as 1,000 km of fiber. Feed gas may flow on the shell or bore side of the fibers. The permeate gas or residue gas streams, or both, may be routed to collection pipes by which they exit the module.

Flat-sheet membranes are commonly packaged into spiral-wound modules. A spiral-wound module has a central perforated permeate collection tube, around which are wound membrane envelopes interleaved with spacers to define feed and permeate channels. The module is usually finished with an outer wrap of fiberglass or the like and mounted in a pressure housing. Feed passes axially down the module across the membrane envelope. A portion of the feed permeates into the membrane envelope, where it spirals towards the center and exits through the collection tube, which may protrude at one or both ends beyond the membrane envelope. Modules typically contain multiple membrane envelopes, such as 20 or more, and have a usable membrane area of up to 40 or 50 m$^2$.

Less commonly, membrane elements may take other forms. For example, they may simply be rigid tubes, such as ceramic tubes, with the selective membrane as the inside or outside surface.

Modules or elements are normally built in standard sizes. Ideally, the standard size module is limited to that which can be handled easily by one or two persons, with a weight up to about fifty pounds. The requirement for a specific membrane area is met by installing the appropriate number of factory-made elements in suitable permanent housings. If the membranes need to be replaced in the field, the complete module is removed from the housing and replaced with a new factory-built module. This procedure minimizes any plant downtime required for membrane replacement.

In gas processing plants, gas flows and membrane performance are such that membrane area requirements may be very large, in the range of hundreds, thousands or even tens of thousands of square meters. Large numbers of modules need to be installed in such plants and housed in an effective and economical manner.

In gas separation, individual modules or elements may be connected end-to-end, typically in a line of up to about six modules, within a single tube. The tube serves not only to house and support the membrane elements and provide a directed gas flow, but also as the pressure-withstanding vessel that permits operation of the membrane unit at pressures substantially different from the outside atmospheric pressure. The tubes are usually made of stainless or carbon steel, and pressure code-stamped for their intended application. A single module or element may also be housed in its own pressure vessel.

Various other arrangements have been proposed for arranging multiple membrane modules or elements within a single pressure housing, mostly for reverse osmosis applications.

U.S. Pat. No. 3,774,771 describes an assembly of modules mounted in parallel within a single housing. The modules consist of product tubes around which a piece of reverse osmosis membrane is wound in a helical pattern. Each of these modules is contained within a feed flow tube. The feed flow tubes are connected so that feed can be introduced through an inlet at one end of the housing to several tubes in parallel, can pass down this set of tubes to the other end of the housing, and then pass back along the housing through another set of tubes. Residue is withdrawn from this set of tubes through an outlet adjacent to the feed inlet. Liquid that has permeated the membranes and entered the product tubes is collected and withdrawn through an outlet at the other end of the module.

Each feed flow tube has a hole that allows a volume of feed liquid to leak out from the processing path within the tubes to the space within the housing outside the feed tubes. In this way, pressure is equalized on both sides of the tubes. The assembly is used for reverse osmosis.

U.S. Pat. No. 4,083,780 describes an assembly containing multiple tubes arranged in parallel, with multiple spiral-wound modules in series within each tube. The permeate from the line of modules in each tube is withdrawn from a separate port.

U.S. Pat. No. 5,238,563 describes an assembly in which multiple membrane modules or elements are housed in parallel. The feed is introduced through a nozzle in the longitudinal shell of the housing and occupies the space between the external surfaces of the modules and the internal surface of the housing. The assembly uses two tube sheets to create three separate sealed areas within the housing.

U.S. patent application Ser. No. 11/050,995, co-owned and copending with the present application, describes an assembly containing multiple tubes arranged in parallel, each tube containing one or more membrane modules. The tubes are supported by two tube sheets that divide the interior of the assembly into three gas-tight spaces. This application is incorporated herein by reference in its entirety.

There remains a need for assemblies that enable gas separation membrane modules to be housed in compact housings that are simple and safe, as well as inexpensive to manufacture, and that provide for easy replacement of modules within the housing. As new gas separation applications develop, some with very large membrane area requirements, this need is more pressing.

SUMMARY OF THE INVENTION

The invention has two aspects: a gas-separation membrane assembly, and a gas-separation process using the assembly. In a basic embodiment, the assembly comprises a set of tubes containing the gas-separation membranes, the tubes being arranged within a single vessel or housing.

In its most general embodiment, the assembly includes the following elements:

(a) a housing comprising a shell and at least one removable head, and enclosing an interior region;
(b) a plurality of tubes, each having a first end and a second end, positioned in parallel within the housing and enclosing a plurality of gas separation membranes, each membrane having a feed side and a permeate side;
(c) a tube sheet mounted in the housing and dividing the interior region into two spaces: (i) a feed gas space and (ii) a residue gas space, each in gas-transferring relationship with the feed side, the tube sheet further having a plurality of openings that hold the tubes in spaced-apart relationship;
(d) a feed port in the housing through which gas may be introduced into the feed gas space;
(e) a residue port in the housing through which gas may be withdrawn from the residue gas space;
(f) a permeate port in the housing;
(g) a permeate collection system within the housing, comprising:
  (i) for each tube, a permeate outlet pipe positioned at the first end and adapted to capture permeate gas from the gas separation membranes within the tube;
  (ii) a permeate manifold positioned within the interior region, into which each permeate outlet pipe is connected, and which is itself connected to the permeate port.

In light of the teachings presented in this summary and the following detailed description of the invention, it will be apparent to the skilled worker that various essentially equivalent mechanical options are available to achieve the above-defined combination of elements, such as to support the tubes in the space, and to provide the means of gas flow between the designated areas.

Likewise, it will be appreciated that the assembly will incorporate a number of standard components familiar to those of skill in the art, including, but not limited to, O-rings, seals, end caps and connectors of various kinds, such as are needed to provide gas-tight closure between elements, for example, or to connect individual parts in a conventional manner.

The housing may be of any shape and construction appropriate to its function, which is to contain the tubes, and to provide pressure- and gas-tight spaces or environments into which gas can be introduced, and from which it can be withdrawn. Typically the housing is a steel pressure vessel with two ends and an elongated central section, adapted to withstand the relatively high differential pressures that are used in gas separation, and pressure code-stamped accordingly.

Most preferably, the vessel is a cylindrical shell with two ends, one of which takes the form of a reversibly removable head. Optionally, a removable head may be used at both ends.

The tubes containing the gas-separation membranes are mounted in the housing, usually in a longitudinal direction, that is, parallel to a long axis of the housing and to each other.

The tubes are usually mounted in the housing by means of a tube sheet, which supports the tubes directly or indirectly. Preferably the assembly has only one tube sheet. This simplifies the manufacture of the housing or pressure vessel, with consequent reduction in weight and cost. Optionally, a second, or more, tube sheets or supports may be used, but are not required.

The tube sheet is aligned generally perpendicular to the longitudinal axes of the housing and the tubes, thus dividing the space within the housing into two discrete spaces—a first, or feed, space and a second, or residue, space. Typically, but not necessarily, as explained below, the tubes are mounted with one end in the feed space and the other end in the residue space.

The housing and tube sheet are connected in gas-tight relationship with each other, so that gas cannot bypass the tubes and flow directly between the feed and residue spaces. The connection can be made in a reversible or permanent manner.

The housing is equipped with three ports or nozzles: a first, or feed, port opening into the first or feed space; a second, or residue, port opening into the second or residue space; and a third, or permeate port. Through these nozzles, feed gas can be introduced into the housing, and treated gas can be withdrawn from the housing.

The tubes contain gas-separation membranes of any type usable for gas separation, including, but not limited to, polymeric membranes with a rubbery selective layer and polymeric membranes with a glassy selective layer. Preferably, the membranes are formed as hollow fibers or flat sheets.

The membranes are usually packaged into membrane elements or modules. If the membranes are flat sheet membranes, they are preferably packaged into spiral-wound modules.

The tubes may contain a single module or a plurality of modules. If there is only one module per tube, optionally the wrap or casing of the module may itself serve as the tube.

If multiple modules per tube are used, the modules are aligned end to end, preferably in series, so that gas that has passed through one membrane element flows into the next element.

The tube sheet may support the tubes in any convenient manner. Thus, the tubes may butt against the tube sheet, fit into holes, grooves or lips in the tube sheet, or protrude through holes in the tube sheet, for example.

The tubes are aligned with sets of openings or holes in the tube sheet. The openings may be large enough for the modules to pass through, to enable the modules to be inserted into, and removed from, the tubes. In this case, the tube sheet typically has openings of about the same diameter as the tubes.

In the alternative, the tubes may be supported indirectly by the tube sheet, such as by a pipe protruding from the tube sheet against, into or through the tube sheet. In this case, the tube ends need not touch the tube sheet, and the openings in the tube sheet may just large enough for the pipes to pass through.

The tubes and tube sheet should be engaged in a gas-tight manner to prevent leakage of gas between the feed and residue gas spaces. They may be welded or glued together, or the tubes may slide into the tube sheets and be sealed against the tube sheets by an O-ring or the like.

Gas must be able to flow from the feed gas space into the tube to contact the feed sides of the membranes of at least the first membrane module in the tube. Likewise, gas must be able to flow from at least the last membrane module in the tube into the residue gas space. This may be achieved by leaving the tube ends open, by providing suitably spaced openings in the tube walls or by providing a pipe or conduit to direct gas between the interior of the tube and the appropriate gas space. Examples of all these options are given in the detailed description of the invention below.

The permeate collection system resides within the housing and collects the permeate gas from the tubes and directs it to the permeate port. If there is only one removable head, the permeate collection system should be at the end of the housing closer to the removable head.

The permeate collection system includes a set of permeate outlet pipes, preferably one for each tube, protruding away from the tubes in the feed gas space. These pipes are connected, directly or by extension pipes, to a permeate manifold that is also positioned within the housing in the feed gas space.

The manifold is further connected to the permeate port. Preferably the permeate port is equipped with a nozzle or flange facing inward, so that the connection of the manifold to the permeate port is also within the housing.

The permeate outlet pipes, extension pipes and the permeate manifold may be connected to each other and to the membrane modules and the permeate port in any convenient manner. Preferably the connections are reversible, to facilitate insertion, removal and replacement of modules. Optionally, the permeate outlet pipes, extension pipes or both are made of flexible tubing, also to facilitate maintenance tasks.

The tube sheet may be of any material and thickness appropriate to its function. During operation of the assembly in a gas-separation process, there is usually little pressure drop between the feed and residue gas streams, and hence little pressure difference between the gas in the feed and residue gas spaces. In this case, the tube sheet need not be resistant to high pressure differences, and, subject to maintaining its ability to space and support the tubes, may be made relatively thin, or of a relatively light, inexpensive material.

For the same reason, the tubes do not need to withstand high pressure differences and can be made from relatively thin, light materials.

Although elements or features of the assembly have been qualified above by the adjectives "feed" or "residue", this has been done for ease of explanation, and does not mean that the assembly has, necessarily, to be used with the feed gas entering at the feed port into the feed gas space and the residue gas leaving through the residue gas space and the residue port. The assembly can be operated in various ways. This point is discussed further in the detailed description below.

The gas separation assembly of the invention uncouples the two primary functions of the conventional pressure tubes. The modules are contained and the gas flow is directed by the tubes, which need not be pressure rated or code-stamped for high pressure differences. These tubes may be made from many types of standard, off-the-shelf seamless piping, or may be manufactured to much lower pressure-rating than the housing. If only one module per tube is needed, the tube may simply be the outer sleeve or casing of the module. The pressure-withstanding function is now fulfilled by the outer vessel or housing, within which the multiple tubes are contained.

Furthermore, because of the plurality of tubes, the assembly allows large numbers of standard size modules to be accommodated in a single housing. Because the gas feed, residue and permeate connections to the plurality of tubes are internal to the assembly, complex external piping and manifolding systems are not required. The assembly itself fulfills this function, but in a more effective way.

Conventional systems using individual pressure tubes connected by external piping are complex, require much space, and are costly to build. This is especially so in gas processing because the materials being processed are normally hazardous and their safe containment is an absolute necessity.

If these connections are made internal to the pressure vessel, the pressure vessel itself provides the containment in a more robust and compact manner than external piping, and with fewer flanges, gaskets, joints and connectors. The greater simplicity allows faster access, and correspondingly less down time, to replace membrane modules, as well as reducing potential for leakage of hazardous materials. In particular, the number of pipes, flanges and connections is reduced enormously. For example, if the housing contains seven membrane module tubes, the number of external flanges and connecting pipes is reduced seven-fold.

Thus, this uncoupled arrangement offers a number of advantages compared with conventional pressure housing of membrane modules in a single linear arrangement.

The assembly is also lighter in weight than a conventional array of tubes containing the same amount of membrane area, because only the one outer vessel, rather than each tube, need be built to high-pressure-resistant specification. In addition, heat tracing or insulation of the modules is greatly simplified.

These differences result in very substantial savings in terms of manufacturing complexity and capital cost of equipment.

To achieve these benefits, one representative and particularly preferred embodiment of the assembly as it relates to spiral-wound modules comprises:

(a) a housing comprising a shell and a removable head, and enclosing an interior region;
(b) a plurality of tubes each having a first end and a second end, positioned in parallel within the housing such that the first ends are oriented towards the removable head;
(c) a plurality of a first and subsequent spiral-wound modules connected in series within each tube, each module having a permeate collection pipe protruding axially from the module; the first module being closest to the first end with its permeate collection pipe having a collection end protruding towards the removable head;
(d) a tube sheet mounted in the housing and dividing the interior region into two spaces: (i) a feed gas space and (ii) a residue gas space, the tube sheet further having an opening for each tube through which the tube can pass, the openings supporting the tubes in spaced-apart relationship;
(e) a feed port in the housing through which gas may be introduced into the feed gas space;
(f) a residue port in the housing through which gas may be withdrawn from the residue gas space;
(g) a permeate port in the housing;
(h) a permeate outlet pipe for each collection end and connected to each collection end;
(i) a permeate manifold positioned within the interior region, into which each permeate outlet pipe is connected, and which is itself connected to the permeate port.

If only one module per tube is required, a representative and particularly preferred embodiment of the invention as it relates to hollow-fiber modules comprises:

(a) a housing comprising a shell and a removable head, and enclosing an interior region;
(b) a plurality of hollow-fiber modules, each module having a residue end, a permeate end, a cylindrical casing between the ends in which is at least one aperture through which gas may pass, a shell side and a bore side, the modules being positioned in parallel within the housing with the permeate ends oriented towards the removable head;

(c) a tube sheet mounted in the housing and dividing the interior region into two spaces: (i) a feed gas space and (ii) a residue gas space, each in gas-transferring relationship with the shell side, the tube sheet further having a plurality of openings that hold the modules in spaced-apart relationship;

(d) a feed port in the housing through which gas may be introduced into the feed gas space;

(e) a residue port in the housing through which gas may be withdrawn from the residue gas space;

(f) a permeate port in the housing;

(g) a residue collection pipe protruding from the residue end of each module at least far enough to provide gas-transferring relationship between the module and the residue gas space;

(h) a permeate outlet pipe connected to each permeate end;

(i) a permeate manifold positioned within the interior region, into which each permeate outlet pipe is connected, and which is itself connected to the permeate port.

In its second aspect, the invention is a gas-separation process using the assembly in any of its embodiments. The process may be used to separate components of any gas or vapor mixture, and is expected to be especially useful in refinery or natural gas treatment applications, where gas flow rates tend to be large and gas pressures high.

BRIEF DESCRIPTION OF THE DRAWINGS

FIG. 8(a) represents an assembly using conventional pressure tubes, and not in accordance with the invention. FIG. 8(b) represents an assembly of the invention using vessels housing seven tubes, and FIG. 8(c) represents an assembly of the invention using vessels housing 19 tubes.

DETAILED DESCRIPTION OF THE INVENTION

Figure 1:
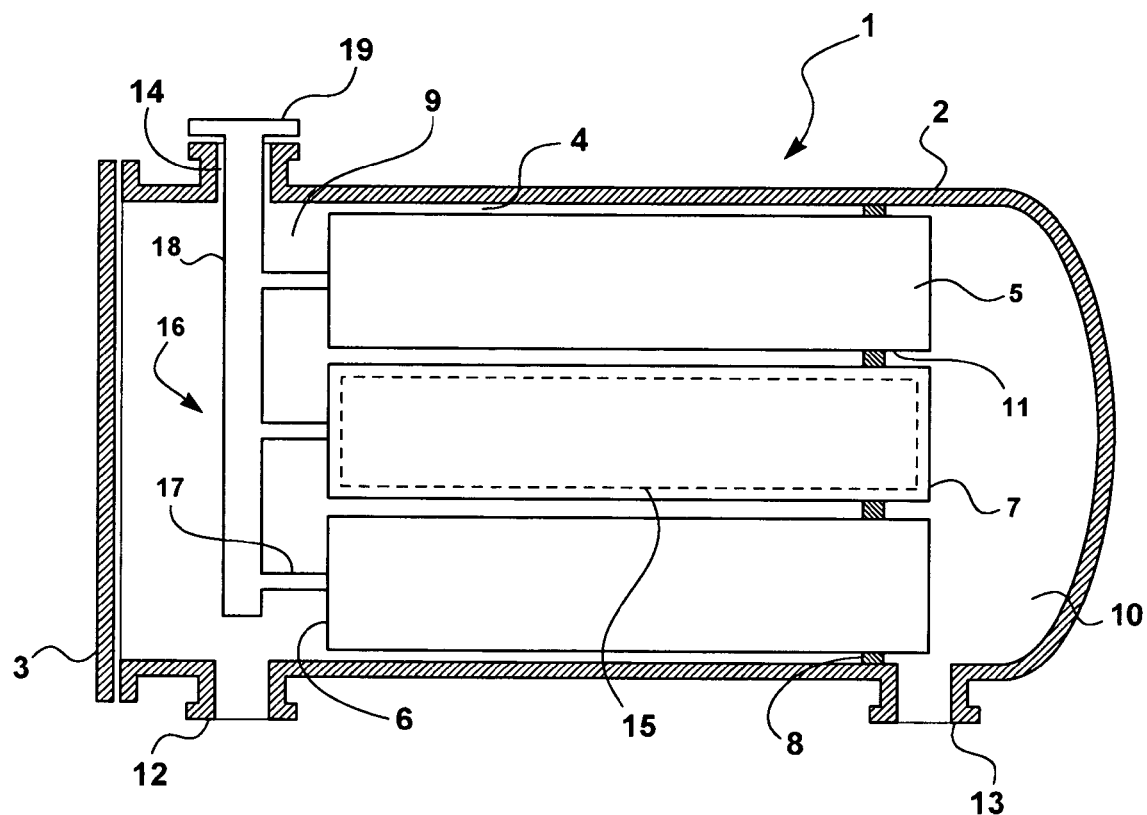
FIG. 1 is a schematic drawing showing a longitudinal section through the assembly of the invention.

The invention is a gas-separation membrane assembly, and a gas-separation process using the assembly. The assembly incorporates multiple gas-separation membranes in an array within a single vessel or housing, the terms vessel and housing being used interchangeably herein.

Feed gas to be treated by membrane separation can be introduced into the housing; the separated, treated gas can be withdrawn from the housing.

The vessel may be of any form appropriate to its function, which is to provide an internal environment in which membrane gas separation can be carried out safely at substantially different (higher or lower) pressures than the outside atmospheric pressure.

A variety of vessel shapes are possible within the scope of the invention, although typically the housing is of elongated form. Most preferably the housing takes the form of a cylindrical vessel, that is, a vessel having a cylindrical shell and two ends.

At least one of the ends, and optionally both, should be a reversibly removable end cap or head that provides access to the interior of the housing for installation or removal of membrane modules. By this, we mean that the head should not be a unitary part of the vessel as cast, nor attached by welding, but should be bolted, screwed, or the like, to the vessel.

The end caps may have any appropriate profile, but usually will be flat or domed. Removable heads typically include a flange or flanges or a screw thread for attachment to the shell body of the vessel.

Many gas separations, such as those used to bring natural gas to pipeline specification, are performed with the feed gas to the membrane units at elevated pressure, such as above 150 psig, above 300 psig, above 500 psig or even up to 1,000 psig or more. The permeate gas may also be maintained at above atmospheric pressure in some cases, or may be under vacuum in others. Thus, considerable pressure differences frequently exist between the outside and inside of the vessel, and between feed and permeate containing components within the vessel, and the vessel should be pressure-rated and code-stamped accordingly. For convenience herein, we refer to gas separation applications in which the vessel is pressure-rated or code stamped for pressures in the hundreds of psi as intermediate-pressure applications and gas separation applications in which the vessel is pressure-rated or code-stamped for pressure of 1,000 psi or above as high-pressure applications.

The material of which the vessel is formed may vary depending upon the use to which it is to be put and the pressure-rating required. Typically the vessel will be metal, usually steel, either stainless or carbon, although other metals, or even non-metallic materials, could be used in some circumstances.

The housing is equipped with three ports or nozzles, through which gas may enter or leave. The nozzles are positioned to provide gas flow into or out of each discrete gas-tight space within the vessel, as explained below.

Within the housing are multiple tubes that carry the membrane modules and provide a directed path for gas flow.

In principle, many ways to arrange the tubes within the interior space of the vessel can be imagined within the scope of the invention. Based on size, weight and cost considerations, however, the tubes should be packed efficiently into the housing, so as not to leave large volumes of space unoccupied by the tubes.

The preferred arrangement is to align the tubes approximately parallel to each other and to the long axis of the shell of the housing, so that a large number of tubes may be accommodated by a vessel of comparatively small cross-section. As described below, the invention includes additional features that facilitate close packing of the tubes.

The tubes are held in the vessel by means of a tube sheet, which supports the tubes directly or indirectly, usually, but not necessarily, at or near one of the tube ends. The tube sheet is aligned generally perpendicular to the longitudinal axes of the housing and the tubes, and divides the volume within the housing into two discrete spaces.

For ease of nomenclature and clarity of explanation, the first space is designated the feed gas space, and the second space is designated the residue gas space, and elements or features of the assembly identified similarly refer to elements or features in or near those spaces. However, it should be noted that this nomenclature is used because it describes conveniently a mode in which the inventors prefer to operate the assembly for gas separation, not because it describes intrinsic properties of the spaces.

The vessel and tube sheet are connected in gas-tight relationship with each other, so that gas cannot bypass the membrane-containing tubes and flow directly from the feed gas space to the residue gas space. The tube sheet may be removably or permanently secured to the vessel in any known manner, for example, by welding.

The tube sheet may be made of the same material as the vessel, such as steel. However, the tube sheet is subjected only to whatever pressure drop occurs from the feed gas to the residue gas, which is usually no more than a few psi, for example 50 psi, 20 psi or less. The tube sheet can optionally be relatively thin and lightweight, therefore.

Likewise, the tubes themselves need only withstand the slight feed-to-residue pressure drop and can be made much thinner and lighter than conventional, industrial gas-separation tubes. That the individual tubes need not serve any significant pressure-withstanding function is one of the benefits of the invention, and reduces the manufacturing cost of high-pressure gas separation systems substantially.

In our invention, the functions of the tubes include carrying the membranes, usually arranged as membrane modules, and directing gas flow.

Each tube may contain a single membrane module, also commonly referred to as a membrane element or cartridge. Most membrane modules as manufactured or purchased have an elongated form, with a sleeve, casing or wrap around the length of the module, and end caps at one or both ends. If the module takes this form, and only one module per tube is needed, the sleeve, casing or wrap of the module itself may serve as the tube, so long as it is gas tight and able to withstand the expected feed-to-residue pressure drop.

Often, however, multiple modules per tube will be required to meet the required gas-processing capacity. In this case, each tube preferably contains at least two and no more than about six membrane elements.

The type and configuration of the membranes and modules is not a limiting aspect of the invention; any types of membranes and modules known in the gas separation arts can be housed in the present assembly. The membranes may be any type of membrane usable for gas separation, including, but not limited to, polymeric membranes with a rubbery selective layer and polymeric membranes with a glassy selective layer.

Most commonly, industrial gas separation membranes are prepared as hollow fibers and packaged as potted hollow-fiber modules, or prepared as flat sheets and packaged as spiral-wound modules. As a less common example, they may be in tubular form, with the selective membrane on the inner or outer surface. This type of module is sometimes used when the separation membranes themselves are inorganic, or are supported on an inorganic support membrane, for example.

These forms are well known in the art and are described copiously in the literature. For simplicity, therefore, the details of module placement and connection, and gas flow around and within the modules, are described below, for the main part, as they relate to polymeric membranes packaged as spiral-wound modules. Those of skill in the art will appreciate that similar arrangements of modules within the tubes and housing can be used for hollow-fiber modules or other arrangements, subject only to minor, straightforward modifications as need be.

As mentioned in the background section, a spiral-wound module comprises one or more membrane envelopes of spacers and membrane wound around a perforated central permeate collection pipe. Typically, the pipe protrudes a short distance beyond the membrane envelopes. When the module is in use, feed gas passes axially down the module across the membrane envelope. A portion of the feed permeates into the membrane envelope, where it spirals towards the center, is drawn through the perforations into the permeate collection pipe and exits through one or both ends of the pipe. The residue gas exits the module axially at the opposite end from that at which the feed gas is introduced.

If a tube contains multiple modules, the modules are connected end-to-end, meaning that permeate gas leaving one module can flow into the permeate channel of an adjacent module. This can be achieved by having one long continuously formed permeate collection pipe around which multiple membrane modules are wrapped. More preferably, however, the permeate collection pipes of the individual modules are separate pipes protruding from the modules and joined by gas-tight connectors or couplings, leaving an unconnected, open pipe end at one or both ends of the tubes.

Most preferably, these couplings join the permeate collection pipes in a reversible manner, so that an individual membrane element can be removed and replaced as necessary. For example, the connectors may be flanged or screwed. More commonly they take the form of proprietary quick-release fittings of clamped or compression design, such as TriClover® or Swagelok® fittings, or are simple bayonet fittings with simple O-ring seals.

A permeate collection system gathers the permeate gas stream leaving each tube and directs it to the permeate port. The permeate collection system includes multiple permeate outlet pipes, which are connected to the open ends of the permeate collection pipes. Preferably, these connections are made reversibly, using connectors or couplings as mentioned above.

The permeate collection system also includes a permeate manifold, into which the permeate outlet pipes are connected, either directly or indirectly, such as through extension pipes. These connections are again preferably made by reversible couplings.

The permeate manifold is connected to the permeate port in any convenient manner, such as by a flange or a screw thread, for example.

In use, the piping and manifold of the permeate collection system will be exposed to the pressure difference between the feed/residue gases and the permeate gas. The piping and manifold will often have to withstand a pressure difference of hundreds of psi and should be rated accordingly.

To facilitate connection of the permeate collection system to the ends of the permeate collection pipes and to the permeate port, the permeate outlet pipes or their extensions may be made from flexible piping.

The inside diameter of a tube is usually, and preferably, only marginally larger in diameter than the outer diameter of the membrane module(s) that it contains, so that the modules, with their permeate collection pipes connected, can simply be pushed into the tubes, where they fit snugly without additional support.

An elastomeric seal, or the like, is normally fitted around the circumference of the modules to provide a gas tight fit to prevent incoming gas bypassing the module. In this case, gas introduced from the feed gas space into a tube enters the first end of the first membrane module, passes along the module and exits at the residue end into the space within the tube between the first and second modules. The gas flowing through this space forms the feed to the second module, and so on.

As an alternative, the modules can be spaced a distance from the inner wall of the tube, such as by means of a perforated inner tube of smaller diameter, so that gas entering the tube from the feed space may flow directly into any and all of the first, second or subsequent membrane elements in a parallel flow configuration.

The tube sheet may support the tubes in any convenient manner. Thus, the tubes may butt against the tube sheet, fit into holes, grooves or lips in the tube sheet, or protrude through holes in the tube sheet, for example. The tubes are usually aligned with openings in the tube sheet to permit gas to leave the feed gas space at one end, and to enter the residue gas space at the other.

The openings may be large enough to accommodate the tubes themselves. This option is especially preferred if the tubes contain spiral-wound modules of conventional design.

The membrane elements can be installed in the tubes from the ends that face towards the removable head. Thus, it is convenient, and preferred, that these tube ends be open and unobstructed, with diameters large enough to receive the modules. This not only enables membrane modules to be inserted and removed easily, but also presents a broad cross-section open to gas flow, as discussed below.

The tubes and tube sheet engage one another to form a gas-tight seal, to prevent leakage of gas from the feed space directly to the residue space. The seal can be made in a reversible or permanent manner. If the tube sheet engages the tubes at some point along the cylindrical surface of the tubes, it is preferred that the seal be permanent, and specifically that the tubes and tube sheet be welded or glued together.

Figure 3:
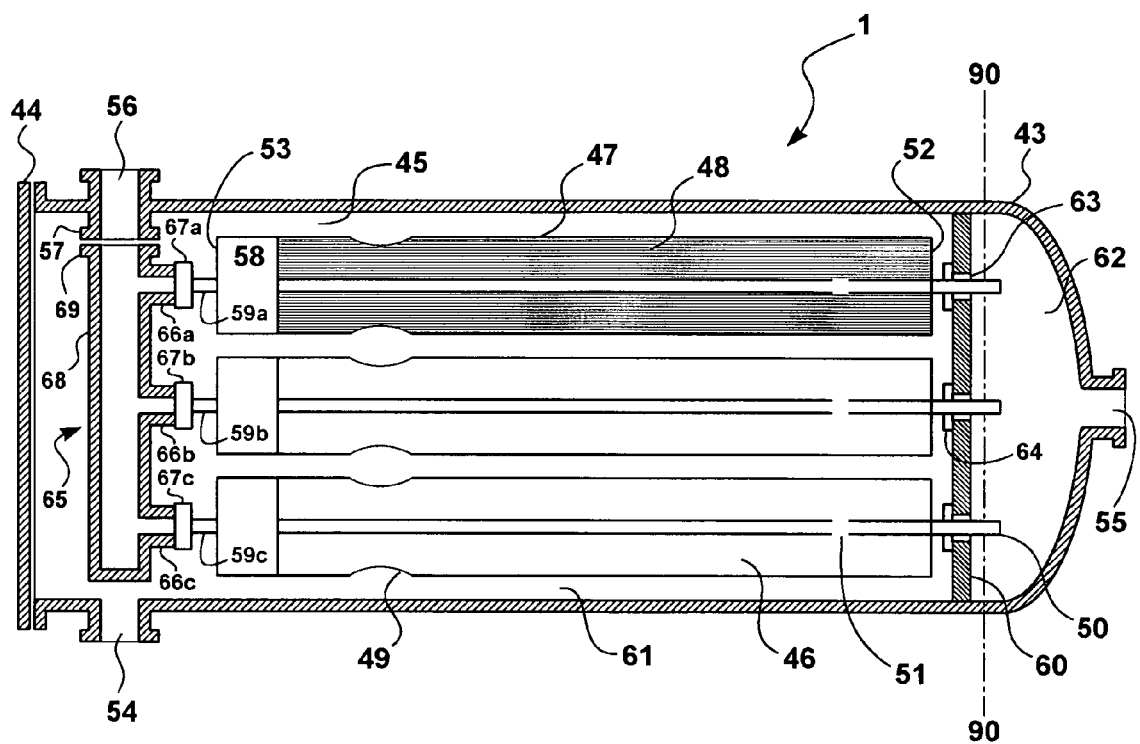
FIG. 3 is a schematic drawing of a preferred embodiment of the invention having one hollow fiber module per tube in a longitudinal central section.

As an alternative, the openings in the tube sheet may be smaller than the diameter of the tubes, but large enough to allow a gas collection or delivery pipe to pass through. A representative example of this type of embodiment is shown in FIG. 3, discussed below. In this case the tube sheet may support the tubes only indirectly, by means of the gas collection pipe, and it is preferred that the gas-tight seal between the tubes and the tube sheet be reversible, such as by means of a gasket, O-ring or elastomeric bayonet-type fitting through which the pipes can be pushed.

One advantage of this alternative is that the tube sheet is stronger mechanically, as more of its total area is solid. Another advantage is that the tubes can be packed closer together.

The tube sheet divides the feed gas space from the residue gas space. In the preferred mode of operating the assembly, gas flows into the housing through the feed port to the feed gas space, and from there enters the tubes and the first membrane module. Residue gas from the last module in line in the tube flows out of the end of the last module, out of the tube and into the residue gas space, whence it is withdrawn through the residue gas port.

Thus, the tubes must be adapted to allow feed gas to enter from the feed gas space at one end and residue gas to flow into the residue gas space at the other. The simplest way to achieve this is that the ends of the tubes are positioned in these respective spaces, and the both tube ends are open and unobstructed. This configuration works well if the gas separation membranes are configured as spiral-wound modules, for example.

If it is desired to close one or both tube ends for any reason, such as to capture the permeate gas or residue gas from a bundle of hollow-fiber membranes residing within the tubes, then one or more apertures or openings near the closed end, and large enough to provide unobstructed gas flow, may be provided in the cylindrical walls of the tubes.

As another alternative, a pipe may be provided at an otherwise closed tube end to gather gas from or distribute gas to the modules in the tubes.

In any of these configurations, the tubes are exposed across their walls only to the relatively small pressure differences between the feed and residue gas. As a result, the tubes may be made from off-the-shelf seamless piping, for example, or may be manufactured to much lower pressure-rating than was required for the pressure tubes of prior art gas separation systems. The pressure-withstanding function is now fulfilled by the outer vessel or housing, within which the multiple tubes are contained.

A basic embodiment of the invention, including the principal elements or features of the assembly, is shown in FIG. 1, in the form of a simplified schematic drawing of a lengthwise central section of the assembly. Referring to this figure, the assembly comprises a housing generally indicated by numeral 1. The housing comprises a domed shell, 2 and a removable head, 3 and contains a plurality of tubes, 5, each with a first end, 6, facing the removable head and a second end, 7.

The housing encloses an interior space, 4, which is divided by tube sheet, 8, into two gas-tight spaces: a first or feed gas space, 9, and a second or residue gas space, 10. The tube sheet typically takes the form of a perforated plate, having a plurality of openings, 11, into which the tubes fit, so that end 6 is in the feed gas space and end 7 is in the residue gas space.

In FIG. 1, the tube sheet is shown as positioned toward one end of the housing. This position is representative, but not limiting. It will be clear from the drawing that the tube sheet could be positioned toward the other end of the housing, at or near the longitudinal center of the housing, or at any other position between the ends, so long as the tubes are supported and the feed gas space and residue gas space are appropriately divided.

Each tube contains one or more one membrane modules, indicated in a general manner by dashed box, 15. For clarity, the membrane module(s) are indicated on the figure only in the center tube.

Three tubes are visible in the central longitudinal section, representing an assembly with 7 tubes in total, spaced as shown in axial view in the layout diagram of FIG. 5, discussed below.

The vessel includes three ports, 12, 13, and 14, in the outer wall, one port accessing each gas-tight area within the vessel. The ports enable gas to flow between environments outside the vessel, such as pipes, and the corresponding areas within the vessel.

The assembly is adapted by the permeate collection system, indicated generally by numeral 16, to collect permeate gas from the membrane modules and allow this gas to flow to the permeate port, 14. Typically, this is achieved by collecting the permeates from the modules within a tube into a single permeate outlet pipe, 17, for that tube. The permeate outlet pipes are manifolded together into permeate manifold, 18, which is connected to permeate port 14 by flange, 19.

Figure 2:
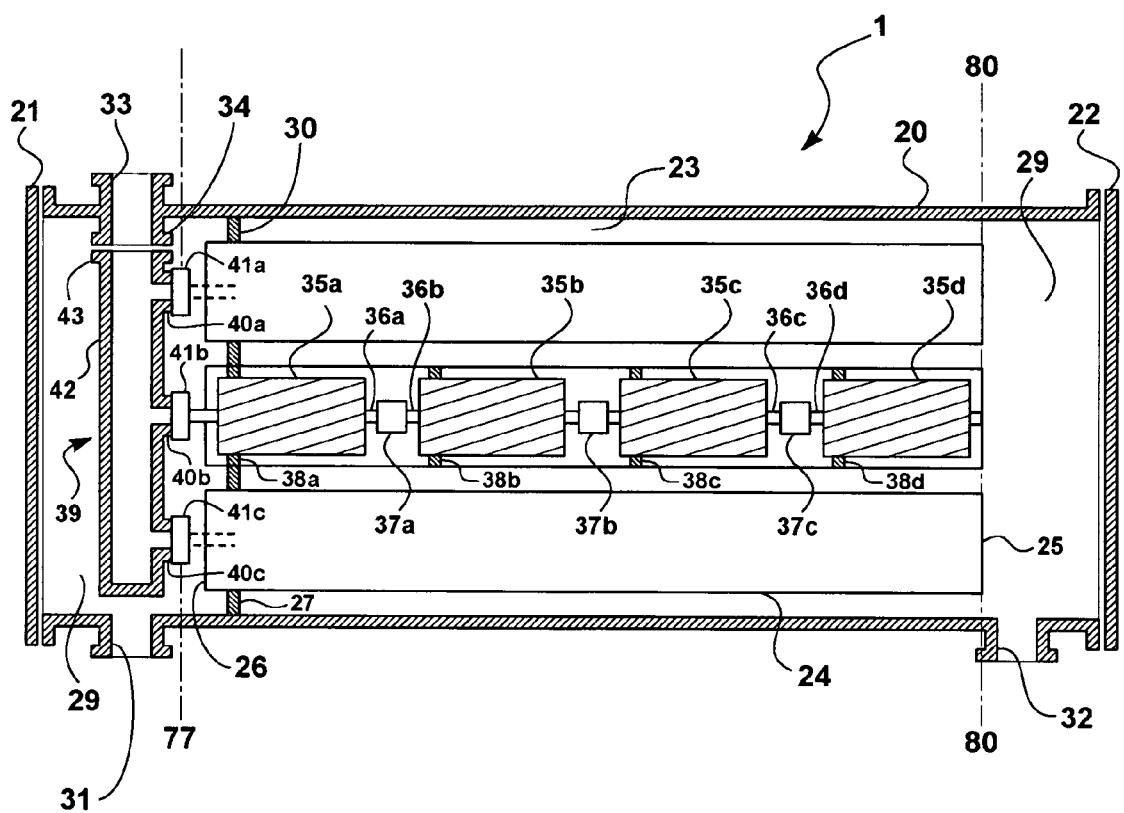
FIG. 2 is a schematic drawing of a preferred embodiment of the invention having multiple membrane modules per tube in a longitudinal central section.

A representative and preferred embodiment of the invention is shown in longitudinal central section in FIG. 2. Referring to this figure, the assembly again includes a housing, generally indicated by numeral 1.

The housing has two removable heads, 21 and 22, and a cylindrical shell, 20, that together enclose interior region, 23. In the drawing, the heads are shown as flanged, and assumed to be connected to the shell by bolts (not shown), although any convenient means to connect the heads to the shell is intended to be within the scope of this embodiment.

A feed port, 31, and a permeate port, 33, are positioned near one head; a residue port, 32, is positioned near the other. The permeate port is adapted to provide an interior flange, 34.

The housing contains a plurality of tubes, 24, of which three tubes are shown in the cross section, only the bottom one being labeled to avoid long lead lines over other parts of the drawing. Each tube has a residue end, 25, and a permeate end, 26, both of which are open.

Each tube contains gas-separation membranes, 35, shown here in the form of four membrane elements, 35a-d, arranged in line along the tube. The membrane elements each have a permeate pipe, 36a-d, protruding from both ends, and the pipes are connected in line by connectors, 37a-c. The modules are sealed against the tube walls by annular seals 38a-d.

For clarity, the membrane module(s) are only indicated on the drawing in the center tube. As with FIG. 1, three tubes only are shown in the central longitudinal section of FIG. 2, representing an assembly with 7 tubes in total, laid out as in FIG. 5.

A tube sheet, 27, is welded or otherwise mounted in the housing towards the permeate end of the tubes. This tube sheet is perforated by openings, 30, of about the same diameter as the ends of the tubes. In this embodiment, the tubes and tube sheets are assumed to be joined by adhesive or by welding. Another option is to slide the tubes through the openings, then seal with a gas-tight seal. The tube sheet supports the tubes in spaced-apart relationship with each other.

The tube sheet divides the interior, 23, into two separate gas-tight spaces: feed gas space, 28, and residue gas space, 29. These spaces are partially occupied by the tubes, which are held in place by the tube sheet.

Figure 4:
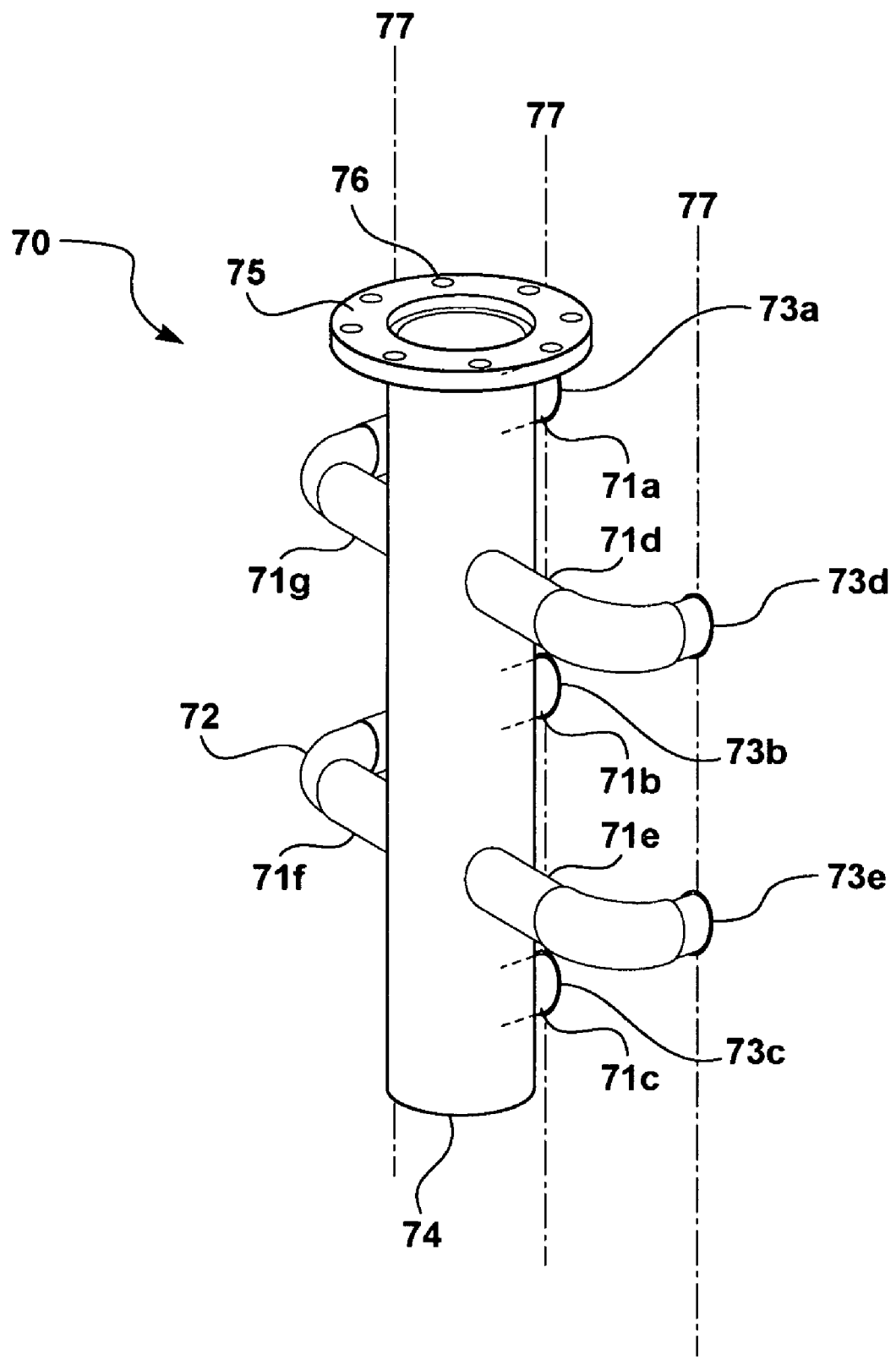
FIG. 4 is a schematic drawing of a preferred configuration for the permeate collection system.

Permeate collection system, 39, has three permeate outlet pipes, 40a-c, which are attached to the protruding ends of permeate pipes 36a-d by connectors 41a-c. The permeate outlet pipes are attached to permeate manifold, 42. In FIG. 2, the permeate outlet pipes and manifold are shown as a unitary construction, with the outlet pipes welded to the manifold. Another option is to use separate pipes or extensions connected to the manifold. Further details and options for the permeate collection system are shown in FIG. 4, described below. The manifold is equipped with a flange, 43, to enable it to be bolted to interior flange, 34.

In the embodiment shown in FIG. 2, both heads are drawn as removable. This arrangement provides the greatest flexibility for assembling the unit, either initially or after maintenance or repair, because the membrane elements can be loaded into the tubes, or taken out of the tubes, from either end.

If less flexibility is needed, this design can be simplified by replacing head 22 by a fixed end, or by making this end a unitary part of the vessel body. The modules must then be loaded or unloaded from the permeate end only, but the manufacturing cost of the vessel may be reduced.

Another representative and preferred embodiment of the invention is shown in longitudinal central section in FIG. 3. In this case, the embodiment uses hollow-fiber membranes, and the casings of the modules serve also as the tubes, so that this represents the case in which there is only one module per tube.

Referring to this figure, the assembly again includes a housing, generally indicated by numeral 1. In this case, the housing comprises domed shell, 43, and a removable permeate head, 44, the vessel and the head together enclose interior region, 45.

A feed port, 54, and a permeate port, 56, are positioned near the permeate head; a residue port, 55, is positioned at the other end of the vessel. The permeate port is adapted to provide an interior flange, 57.

The housing contains a plurality of hollow-fiber membrane modules, 46, of which three are shown in the cross section, only the bottom one being labeled to avoid long lead lines over other parts of the drawing. As with FIGS. 1 and 2, three tubes only are shown in the central longitudinal section of FIG. 3, representing an assembly with 7 tubes in total, laid out as in FIG. 6.

Each module contains hollow-fiber membranes, 48, for clarity shown only in the top module. Each set of membranes is contained in a module casing or tube, 47, and each tube or casing is equipped with at least one aperture or opening, 49 to enable feed gas to enter the module and contact the feed or shell side of the membranes.

Each module also contains a residue collection pipe, 50, equipped with at least one aperture or opening, 51, through which gas can pass from the feed sides of the membranes into the collection pipe. The modules also have a residue end, 52, closed except for the residue collection pipe, and a permeate end 53.

At the permeate end within each module is a permeate collection zone, 58, which is open to the bores of the hollow-fiber membranes. The permeate end is closed except for permeate collection pipe or fitting, 59a-c, through which permeate gas can exit the module.

A tube sheet, 60, divides the interior space into two separate gas-tight spaces: feed gas space, 61, and residue gas space, 62. These spaces are partially occupied by the tubes. The tube sheets are provided with openings, 63, large enough to permit the residue collection pipes, 50, to slide through the tube sheet and protrude into the residue gas space.

In this embodiment, therefore, the tube sheet supports and spaces the tubes indirectly, by means of the residue collection pipes. Seals, 64, provide gas-tight engagement between the tube sheet and residue collection pipes.

Permeate collection system, 65, has three permeate outlet pipes, 66a-c, which are attached to the protruding ends of the permeate collection pipes by fittings, 67a-c. The permeate outlet pipes are attached to permeate manifold, 68. The manifold is equipped with a flange, 69, to enable it to be bolted to interior flange, 57.

FIG. 4 shows a representative preferred option for configuring the permeate collection system, usable with the embodiments of the invention shown in FIGS. 1-3, for example.

Referring to FIG. 4, the permeate collection system, generally indicated by numeral 70, has seven permeate outlet pipes, 71a-g, connected into permeate manifold, 74. Each pipe is equipped with a fitting or connector, 73a-e (ends of pipes 71f and 71g are not visible in the drawing), by which it can be connected to the permeate collection pipes from the tubes of FIGS. 1-3.

For example, in the case of FIG. 2, fitting 73a could be connected to, or correspond to, fitting 41a, fitting 73b could be connected to, or correspond to, fitting 41b, and fitting 73c could be connected to, or correspond to, fitting 41c. Fittings 71d-g would be connected to the permeate collection pipes associated with tubes 86d-f, the positions of which are not indicated on FIG. 2, but that can be seen in cross-section in FIG. 5, described in more detail below.

Outlet pipes 71a-c are straight and outlet pipes 71d-g are curved, so that the ends of these pipes are approximately in a plane 77, indicated by line 77 in FIG. 2. Pipes 71d-g may each be formed as a single curved length of piping, or may incorporate curved extension pieces, 72.

Pipes 71*a-g* may be rigid or flexible pipes, or a combination. For example, the straight portions of the pipe may be rigid, and extension pieces 72 may be flexible.

At the open end of manifold 74 is a flange, 75, with bolt holes, 76. This flange corresponds to flange 43 in FIG. 2, for example.

FIGS. 2, 3 and 4 show specific embodiments that demonstrate the best mode contemplated by the inventors of realizing their invention. It will be seen that a number of permutations and combinations of the arrangement of features is possible, and that a number of equivalent arrangements could readily be developed. These figures are intended to be representative, not limiting, of the invention.

Figure 5:
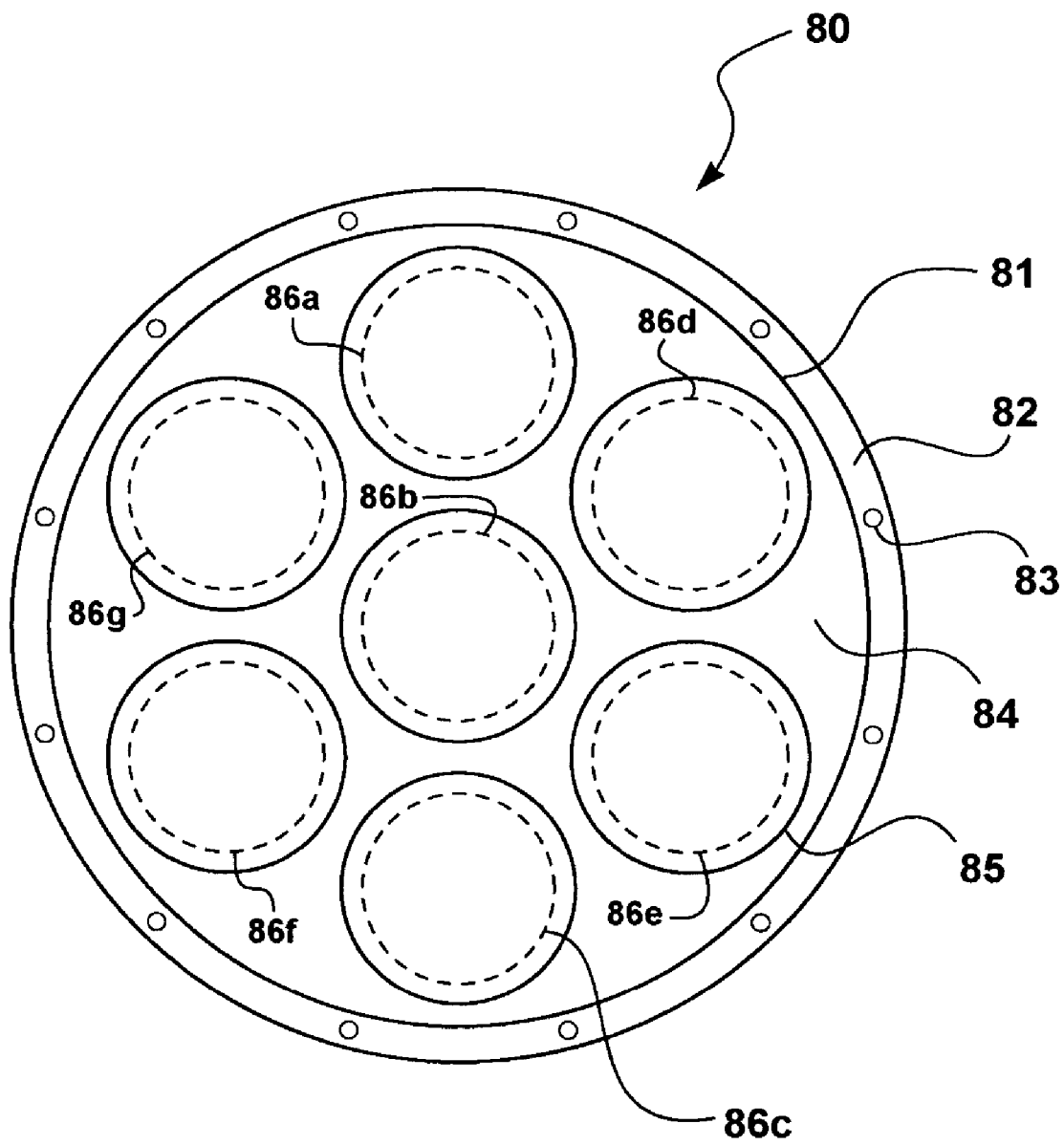
FIG. 5 is a schematic cross-sectional drawing of the position and diameter of openings in the tube sheet of the embodiment of FIG. 2.

FIG. 5 shows a cross-sectional layout diagram of a preferred assembly containing seven tubes. The cross-section shows the relative placement of the tubes and the openings in the tube sheet as would be viewed in FIG. 2 along line 80 looking towards the interior of the vessel with end 22 removed.

Referring to this figure, cross section 80 shows the end of shell wall, 81, including flange, 82 with bolt holes, 83 for attaching the head (not shown). Within the shell, the face of the tube sheet, 84, having seven openings, 85, can be seen. The ends of the tubes, which are just small enough to fit through the openings, are indicated by dashed circles, 86*a-g*.

Figure 6:
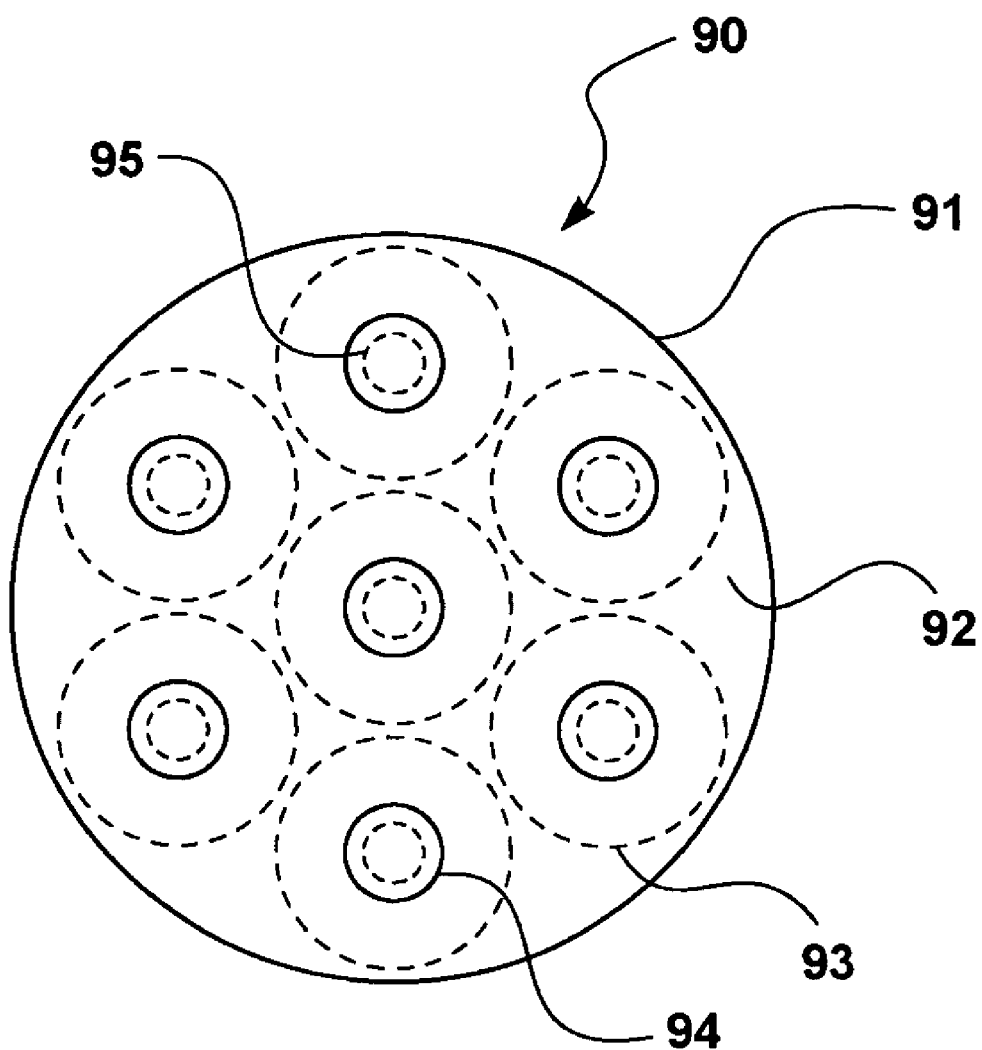
FIG. 6 is a schematic cross-sectional drawing of the position and diameter of openings in the tube sheet in the embodiment of FIG. 3.

FIG. 6 shows a cross-sectional layout diagram of the alternative assembly of FIG. 3, also containing seven tubes. The cross-section shows the relative placement of the tubes and the openings in the tube sheet as would be viewed in FIG. 3 along line 90 looking towards the center of the vessel inside residue port 55.

Referring to this figure, cross section 90 shows the end of shell wall, 91. Within the shell, the face of the tube sheet, 92, having seven openings, 94, can be seen. These openings are much smaller than the diameters of the ends of the tubes, indicated by dashed circles, 93, and just large enough that the ends of the residue collection pipes, indicated by dashed circles, 95, can slide through the tube sheet.

In FIGS. 5 and 6, the diameters of the tubes are assumed to be the same and the circles representing the position of the tube ends are drawn the same size. As can be seen by comparing the diameters of the vessels in the two figures, however, a substantially smaller vessel is needed for the embodiment shown in FIG. 6.

In addition, the ratio of solid area to aperture area is considerably lower in the embodiment of FIG. 6 compared with the embodiment of FIG. 5. Thus, the arrangement of FIG. 6 can provide a tube sheet of proportionately greater mechanical strength, if required.

Figure 7:
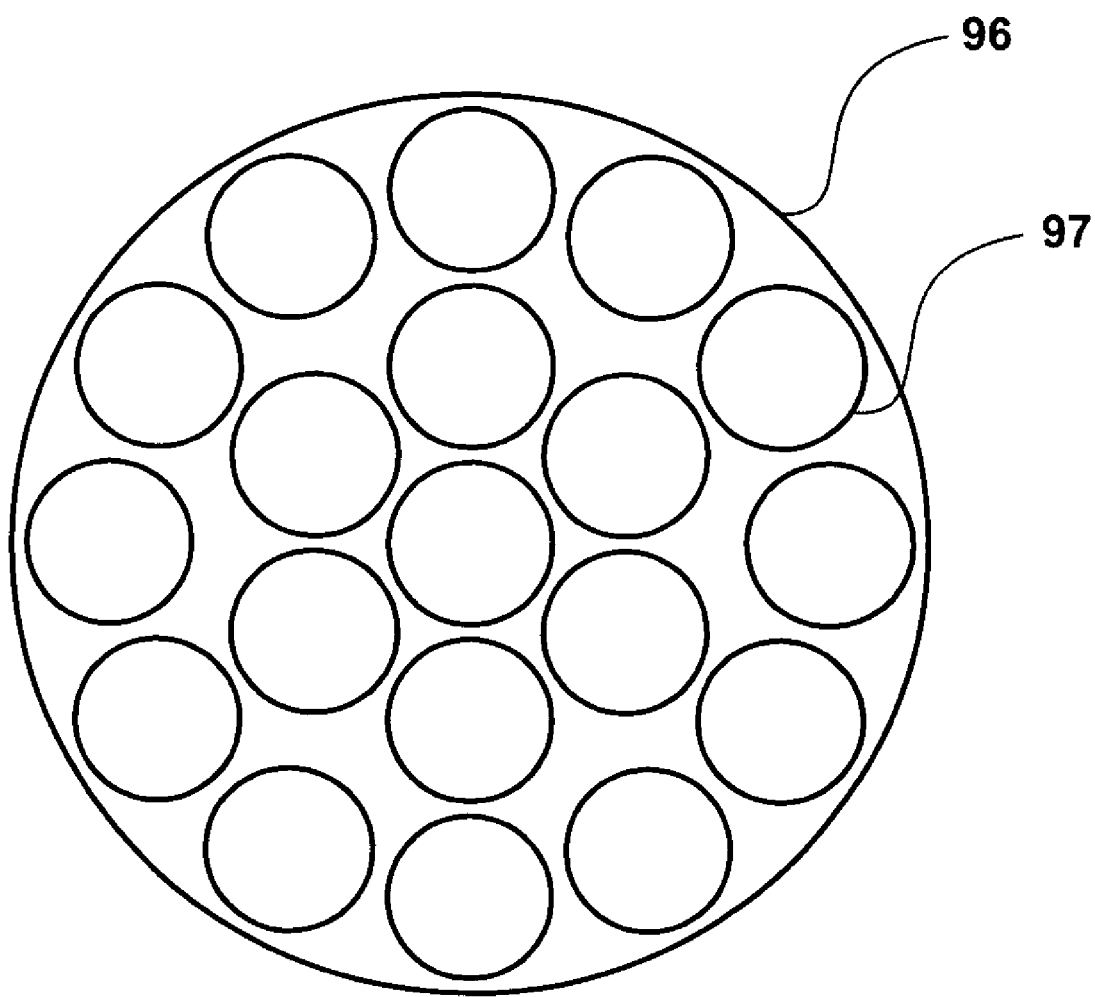
FIG. 7 is a schematic cross-sectional drawing showing placement of 19 tubes in the assembly.

FIG. 7 is a schematic cross-sectional drawing showing how the tubes could be arranged in a vessel, 96, having 19 tubes, 97.

It will be apparent to those of skill in the art that the number of tubes in the housing is not limited to the 7 or 19 shown and described for representative purposes, and any number of tubes could be accommodated by simple and straightforward modification of the explicit teachings herein.

In another aspect, the invention is a gas separation process using the assembly in any of its embodiments. For example, referring again to FIG. 1, a feed gas mixture to be treated is introduced into port 12 and enters the feed gas space 9. From here the gas passes into the tubes 5 and the membrane modules 15.

A driving force for transmembrane permeation is provided, usually by ensuring that there is a pressure difference between the feed and permeate sides of the membranes within the modules. This may involve compressing the feed gas, and/or drawing the permeate gas through a vacuum pump, for example, or any other method known in the art.

The feed gas mixture passes through the modules and is separated into two portions: a residue gas stream, that has not permeated the membranes, and a permeate gas stream, that has permeated the membranes. The residue gas stream passes from the tubes 5 through ends 7 into the residue gas space 10 and is withdrawn through port 13. The permeate gas stream passes out of the tubes at ends 6 into the permeate outlet pipes 17, is gathered into permeate manifold 18 and exits the assembly through permeate port 14.

As can be seen, this mode of operation of the assembly provides an overall feed gas flow in the left-to-right direction with respect to the figures, and an overall permeate gas flow in the right-to-left direction. Depending on the geometry and flow patterns within the modules themselves, this may provide at least partial countercurrent flow between feed and permeate gases, thereby enhancing the separation achieved by the process.

An alternative process embodiment is to introduce the feed gas through port 13 and withdrawn the residue gas through port 12. In this embodiment, the feed gas stream enters residue gas space 10 and flows from there into the tubes 5. The gas then enters the membrane modules at this end, flows along them and is withdrawn into feed gas space 9 and out through port 12. The permeate gas stream flows as before and is collected in manifold 18 and withdrawn through port 14.

Similar gas flow schemes can also be used for the embodiments shown in the other figures. Referring to FIG. 2, the feed gas mixture is introduced into port 31 and enters the feed gas space 28. From here the gas passes into the tubes 24 through open ends 26 and thence enters the first membrane module 35*a* on the feed side of the membranes. The gas flows across the membranes on the feed side, exits the first module as residue gas, from there enters membrane module 35*b* as feed gas, and so on along the series of modules. The residue gas stream from the last module in series, 35*d*, is withdrawn through the open end 25 of the tube into residue gas space 29 and leaves the assembly through port 32.

In each module, permeate gas is collected in permeate pipes 36*a-d* and flows toward permeate collection system 39. The permeate gas from each tube flows out of the tube, through permeate outlet pipes 40*a-c*, is gathered into permeate manifold 42 and exits the assembly through permeate port 33.

Referring to FIG. 3, the feed gas mixture is introduced into port 54 and enters the feed gas space 61. From here the gas passes into the module casings 47 through apertures 49 and thence contacts the hollow fiber membranes 48 on the feed side. The gas flows across the membranes and into residue collection pipe 50 through openings 51. From the residue collection pipes the gas flows into residue gas space 62 and leaves the assembly through port 55.

In each module, permeate gas flows from right to left of the figure and is collected in permeate zone or space 58. From here the gas exits through permeate collection pipes 59*a-c*, into permeate outlet pipes 66*a-c*, permeate manifold 68 and through permeate port 56.

The processes as described above may be used to separate any gas or gases from any gas mixture. It is believed that the processes are particularly useful for natural gas treatment, such as to separate carbon dioxide, nitrogen or hydrocarbons from natural gas, for separation of hydrogen from hydrocarbons, or for various types of air separation.

The invention is now illustrated in further detail by specific examples. These examples are intended to further clarify the invention, and are not intended to limit the scope in any way.

EXAMPLES

Example 1

Comparison of Skid Size Requirements for Gas Separation System Using Conventional Pressure Tubes, Seven-Tube Vessels and 19-Tube Vessels.

An approximate comparison was made of the skid size that is needed to provide sufficient membrane capacity for a system constructed using prior art pressure tubes or the multi-tube pressure vessels of the invention.

Figure 8:
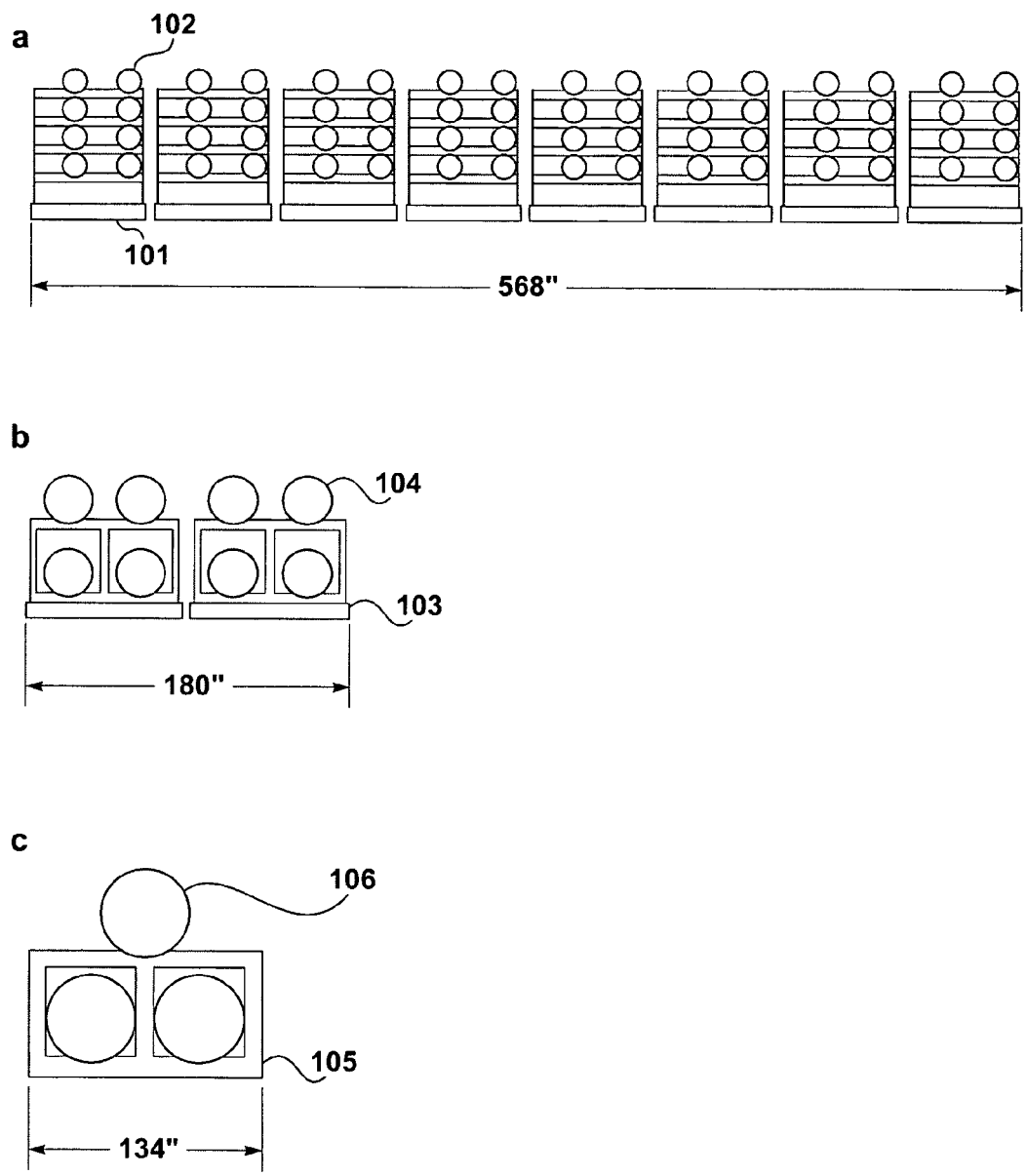
FIG. 8 is a diagram comparing the space requirements for three gas-separations assemblies.

FIG. 8 illustrates the difference in footprint requirements for a gas-separation system using a conventional pressure vessel, a seven-tube vessel and a 19-tube vessel. The system was assumed to need about 4,500 to 5,000 m² of membrane area in the form of spiral-wound modules and to be operating at a feed pressure of about 500 psi. In each case, the membrane modules are arranged in an end-to-end series of 4 modules inside a tube, and the length of the skid is about 23 feet. The difference in size is evident in the different widths.

FIG. 8 (a) shows a conventional configuration, not in accordance with the invention. The tube that contains the modules also serves as the pressure vessel so that each pressure vessel contains four modules. The system requires eight skids, 101, each holding eight pressure vessels, 102. The configuration as shown in FIG. 8(a) uses 256 modules and the total amount of membrane area is 5,120 m². Each skid is about six feet wide. The total area or footprint required per skid is 6×23 or about 140 ft². The total footprint required for 5,120 m² of membrane is thus 140×8 or 1,120 ft².

FIG. 8 (b) shows a seven-tube pressure vessel skid configuration in accordance with the invention. The system requires two skids, 103, each holding four pressure vessels, 104. Each pressure vessel contains seven tubes. The configuration as shown in FIG. 8(b) uses 224 modules and the total amount of membrane area is 4,480 m². Each skid is 7.5 feet wide with a footprint of 7.5×23 or about 170 ft². The total footprint required for 4,480 m² of membrane is thus 170×2 or 340 ft². Compared with FIG. 8(a) above, the membrane system uses about one third the footprint required for the conventional system.

FIG. 8(c) shows a 19-tube pressure vessel skid configuration in accordance with the invention. The system requires one skid, 105, using 3 pressure vessels, 106. Each pressure vessel contains 19 tubes. The configuration as shown in FIG. 8(c) uses 228 modules and the total amount of membrane area for this configuration is 4,560 m². The skid is 11 feet wide with a footprint of 11×23 or about 250 ft². The total footprint required for 4,560 m² of membrane is thus 250 ft². Compared with FIG. 8(a) above, the membrane system uses under one quarter the footprint required for the conventional system.

As can be seen, multi-tube vessels substantially reduce the footprint size of the system. The weight is also reduced.

Example 2

Complexity Comparison of Conventional Pressure Tube, 7-Tube Vessel and 19-Tube Vessel Skid Configurations.

Table 1 compares some properties of standard skid configurations containing roughly comparable membrane area as illustrated in FIG. 8. Using the number of connection features (such as flanges) and tubes as one measure of complexity, it can be seen that seven- or 19-tube pressure vessels greatly decrease the complexity of the skid configuration.

TABLE 1

| Vessel Type | Number of skids | Vessels per skid | Total Vessels | Total footprint (ft²) | Total membrane area (m²) | Total External Flanges |
|---|---|---|---|---|---|---|
| Conventional | 8 | 8 | 64 | 1,120 | 5,120 | 192 |
| 7-tube | 2 | 4 | 8 | 340 | 4,480 | 24 |
| 19-tube | 1 | 3 | 3 | 250 | 4,560 | 9 |

We claim:

1. A gas-separation assembly, comprising:
   (a) a housing comprising a shell and at least one removable head, and enclosing an interior region;
   (b) a plurality of tubes, each having a first end and a second end, positioned in parallel within the housing and enclosing a plurality of gas separation membranes, each membrane having a feed side and a permeate side;
   (c) a tube sheet mounted in the housing and dividing the interior region into two spaces: (i) a feed gas space and (ii) a residue gas space, each in gas-transferring relationship with the feed side, the tube sheet further having a plurality of openings that hold the tubes in spaced-apart relationship;
   (d) a feed port in the housing through which gas may be introduced into the feed gas space;
   (e) a residue port in the housing through which gas may be withdrawn from the residue gas space;
   (f) a permeate port in the housing;
   (g) a permeate collection system within the housing, comprising:
      (i) for each tube, a permeate outlet pipe positioned at one end and adapted to capture permeate gas from the gas separation membranes within the tube;
      (ii) a permeate manifold positioned within the interior region, into which each permeate outlet pipe is connected, and which is itself connected to the permeate port.

2. The assembly of claim 1, wherein the membranes are flat-sheet membranes packaged into spiral-wound modules.

3. The assembly of claim 1, wherein the membranes are hollow fibers potted into hollow-fiber modules.

4. The assembly of claim 1, wherein the membranes are hollow fibers and each tube and the membranes enclosed therein form a single membrane module.

5. The assembly of claim 1, wherein each tube contains multiple membrane modules arranged in series.

6. The assembly of claim 1, wherein the tube sheet is positioned near the feed port.

7. The assembly of claim 1, wherein the tube sheet is positioned near the residue port.

8. The assembly of claim 1, having only one tube sheet.

9. The assembly of claim 1, wherein the first ends are oriented toward the removable head.

10. The assembly of claim 1, wherein the housing comprises two removable heads.

11. The assembly of claim 1, wherein the permeate outlet pipe comprises a flexible tube.

12. The assembly of claim 1, wherein the permeate port has a flange protruding into the feed space to which the permeate manifold is connected.

13. The assembly of claim 1, wherein the plurality of tubes is 7 tubes.

14. The assembly of claim 1, wherein the plurality of tubes is 19 tubes.

15. A gas-separation assembly, comprising:
(a) a housing comprising a shell and a removable head, and enclosing an interior region;
(b) a plurality of tubes each having a first end and a second end, positioned in parallel within the housing such that the first ends are oriented towards the removable head;
(c) a plurality of a first and subsequent spiral-wound modules connected in series within each tube, each module having a permeate collection pipe protruding axially from the module;
the first module being closest to the first end with its permeate collection pipe having a collection end protruding towards the removable head;
(d) a tube sheet mounted in the housing and dividing the interior region into two spaces: (i) a feed gas space and (ii) a residue gas space, the tube sheet further having an opening for each tube through which the tube can pass, the openings supporting the tubes in spaced-apart relationship;
(e) a feed port in the housing through which gas may be introduced into the feed gas space;
(f) a residue port in the housing through which gas may be withdrawn from the residue gas space;
(g) a permeate port in the housing;
(h) a permeate outlet pipe for each collection end and connected to each collection end;
(i) a permeate manifold positioned within the interior region, into which each permeate outlet pipe is connected, and which is itself connected to the permeate port.

16. The assembly of claim 15, wherein the tube sheet is positioned near the feed port.

17. The assembly of claim 15, having only one tube sheet.

18. The assembly of claim 15, wherein the housing comprises two removable heads.

19. The assembly of claim 15, wherein the permeate outlet pipe comprises a flexible tube.

20. The assembly of claim 15, wherein the permeate port has a flange protruding into the feed space to which the permeate manifold is connected.

21. The assembly of claim 15, wherein the housing is made of steel.

22. The assembly of claim 15, wherein each tube contains at least two and no more than six modules.

23. A gas-separation assembly, comprising:
(a) a housing comprising a shell and a removable head, and enclosing an interior region;
(b) a plurality of hollow-fiber modules, each module having a residue end, a permeate end, a cylindrical casing between the ends in which is at least one aperture through which gas may pass, a shell side and a bore side, the modules being positioned in parallel within the housing with the permeate ends oriented towards the removable head;
(c) a tube sheet mounted in the housing and dividing the interior region into two spaces: (i) a feed gas space and (ii) a residue gas space, each in gas-transferring relationship with the shell side, the tube sheet further having a plurality of openings that hold the modules in spaced-apart relationship;
(d) a feed port in the housing through which gas may be introduced into the feed gas space;
(e) a residue port in the housing through which gas may be withdrawn from the residue gas space;
(f) a permeate port in the housing;
(g) a residue collection pipe protruding from the residue end of each module at least far enough to provide gas-transferring relationship between the module and the residue gas space;
(h) a permeate outlet pipe connected to each permeate end;
(i) a permeate manifold positioned within the interior region, into which each permeate outlet pipe is connected, and which is itself connected to the permeate port.

24. The assembly of claim 23, wherein the tube sheet is positioned near the residue port.

25. The assembly of claim 23, wherein the tube sheet is positioned near the residue port and the openings each have a diameter larger than the residue collection pipe and smaller than the tubes.

26. The assembly of claim 23, having only one tube sheet.

27. The assembly of claim 23, wherein the housing further comprises a second removable head.

28. The assembly of claim 23, wherein the permeate outlet pipe comprises a flexible tube.

29. The assembly of claim 23, wherein the permeate port has a flange protruding into the feed space to which the permeate manifold is connected.

30. The assembly of claim 23, wherein the housing is made of steel.

31. A gas-separation process using the assembly of claim 1, and comprising:
(a) introducing a feed gas mixture into the feed port and allowing the feed gas mixture to flow across the gas separation membranes on the feed side;
(b) providing a driving force to induce gas permeation from the feed side to the permeate side;
(c) withdrawing from the permeate port a permeate gas mixture;
(d) withdrawing from the residue port a residue gas mixture.

32. The process of claim 31, wherein the feed gas mixture comprises natural gas.

33. The process of claim 31, wherein the feed gas mixture comprises hydrogen.

34. A gas-separation process using the assembly of claim 15, and comprising:
(a) introducing a feed gas mixture into the feed port and allowing the feed gas mixture to flow across the gas separation membranes on the feed side;
(b) providing a driving force to induce gas permeation from the feed side to the permeate side;
(c) withdrawing from the permeate port a permeate gas mixture;
(d) withdrawing from the residue port a residue gas mixture.

35. The process of claim 34, wherein the feed gas mixture comprises natural gas.

36. The process of claim 34, wherein the feed gas mixture comprises hydrogen.

37. A gas-separation process using the assembly of claim 23, and comprising:
(a) introducing a feed gas mixture into the feed port and allowing the feed gas mixture to flow across the gas separation membranes on the feed side;
(b) providing a driving force to induce gas permeation from the feed side to the permeate side;
(c) withdrawing from the permeate port a permeate gas mixture;

(d) withdrawing from the residue port a residue gas mixture.

38. The process of claim 37, wherein the feed gas mixture comprises natural gas.

39. The process of claim 37, wherein the feed gas mixture comprises hydrogen.

* * * * *

UNITED STATES PATENT AND TRADEMARK OFFICE
CERTIFICATE OF CORRECTION

PATENT NO. : 7,510,594 B2
APPLICATION NO. : 11/271402
DATED : March 31, 2009
INVENTOR(S) : Nicholas P. Wynn et al.

Page 1 of 1

It is certified that error appears in the above-identified patent and that said Letters Patent is hereby corrected as shown below:

In the Specification

Column 1, Line 5

Delete "DE-FG02-03ER83836" and substitute --DE-FG02-05ER84244--

Signed and Sealed this
Sixteenth Day of December, 2014

Michelle K. Lee
*Deputy Director of the United States Patent and Trademark Office*